(12) United States Patent
Shen et al.

(10) Patent No.: US 9,781,400 B2
(45) Date of Patent: Oct. 3, 2017

(54) IMAGE PROCESSING METHOD AND APPARATUS

(71) Applicant: Huawei Technologies Co., Ltd., Shenzhen (CN)

(72) Inventors: Yanhao Shen, Shenzhen (CN); Yin Zhao, Hangzhou (CN); Mengjian Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/065,061

(22) Filed: Mar. 9, 2016

(65) Prior Publication Data

US 2016/0269708 A1 Sep. 15, 2016

(30) Foreign Application Priority Data

Mar. 9, 2015 (CN) .......................... 2015 1 0103406

(51) Int. Cl.
*H04N 9/76* (2006.01)
*H04N 9/77* (2006.01)
(Continued)

(52) U.S. Cl.
CPC ................ *H04N 9/76* (2013.01); *G06T 7/12* (2017.01); *G06T 7/194* (2017.01); *H04N 9/77* (2013.01)

(58) Field of Classification Search
CPC ..................................................... H04N 9/76
(Continued)

(56) References Cited

U.S. PATENT DOCUMENTS 3,158,477 A 11/1964 Vlahos et al.
3,595,987 A 7/1971 Vlahos
(Continued)

FOREIGN PATENT DOCUMENTS

CN 102592295 A 7/2012
CN 103475826 A 12/2013

OTHER PUBLICATIONS

Yi Yang 6U et al: "Quick matting: A matting method based on pixel spread and propagation", 2010 17th IEEE International Conference on Image Processing (ICIP 2010); Sep. 26-29, 2010; Hong Kong, China, IEEE, Piscataway, NJ, USA, Sep. 26, 2810 (Sep. 26, 2010), pp. 4661-4664, XP831813200, ISBN: 978-1-4244-7992-4.*
Partial English Translation and Abstract of Chinese Patent Application No. CN103475826, Sep. 7, 2016, 8 pages.
Ruzon, M., et al., "Alpha Estimation in Natural Images," XP001035585, IEEE Conference on Computer Vision and Pattern Recognition, vol. 1, Jun. 2000, pp. 18-25.
(Continued)

*Primary Examiner* — Michael Lee
*Assistant Examiner* — Justin Sanders
(74) *Attorney, Agent, or Firm* — Conley Rose, P.C.

(57) ABSTRACT

An image processing method and apparatus, where the method includes determining m boundary points of a target image, acquiring a color component of a non-boundary point in a $j^{th}$ area, where the $j^{th}$ area is a neighborhood of the $j^{th}$ boundary point in the m boundary points, $1 \leq j \leq m$, and m is a positive integer greater than or equal to 1, and performing synthesis processing according to the color component of the non-boundary point in the $j^{th}$ area, to obtain a color component of the $j^{th}$ boundary point, and by means of processing on a boundary point of a target image, precision of image matting and synthesis processing may be improved, and may be applied to a real-time image matting and synthesis process.

20 Claims, 5 Drawing Sheets

(51) Int. Cl.
*G06T 7/12* (2017.01)
*G06T 7/194* (2017.01)

(58) Field of Classification Search
USPC .......................................................... 348/587
See application file for complete search history.

(56) References Cited

U.S. PATENT DOCUMENTS

| | | |
|---|---|---|
| 4,007,487 A | 2/1977 | Vlahos |
| 4,100,569 A | 7/1978 | Vlahos |
| 4,344,085 A | 8/1982 | Vlahos |
| 4,409,611 A | 10/1983 | Vlahos |
| 4,589,013 A | 5/1986 | Vlahos et al. |
| 4,625,231 A | 11/1986 | Vlahos |
| 2003/0063797 A1* | 4/2003 | Mao ...................... G06T 7/0083 382/162 |
| 2012/0114240 A1* | 5/2012 | Yamada ................ G06T 7/0081 382/173 |

OTHER PUBLICATIONS

Gu, Y., et al., "Quick Matting: A Matting Method Based on Pixel Spread and Propagation," Proceedings of 2010 IEEE 17th International Conference on Image Processing, Sep. 26-29, 2010, pp. 4661-4664.
Wang, J., et al., "Image and Video Matting: A Survey," Foundations and Trends in Computer Graphics and Vision, vol. 3, No. 2, Jan. 2007, 79 pages.
Foreign Communication From a Counterpart Application, European Application No. 16158465.1, Extended European Search Report dated Sep. 1, 2016, 10 pages.
Machine Translation and Abstract of Chinese Publication No. CN102592295, Jul. 18, 2012, 8 pages.
Foreign Communication From A Counterpart Application, Chinese Application No. 201510103406.7, Chinese Search Report dated May 19, 2017, 2 pages.
Foreign Communication From A Counterpart Application, Chinese Application No. 201510103406.7, Chinese Office Action dated May 31, 2017, 6 pages.

* cited by examiner

IMAGE PROCESSING METHOD AND APPARATUS

CROSS-REFERENCE TO RELATED APPLICATION

This application claims priority to Chinese Patent Application No. 201510103406.7, filed on Mar. 9, 2015, which is hereby incorporated by reference in its entirety.

TECHNICAL FIELD

The present disclosure relates to the field of image processing, and in particular, to an image processing method and apparatus.

BACKGROUND

In the field of image and video processing, image matting and image synthesis is an important technical direction. With the development of science, an image matting and image synthesis technology has been increasingly widely applied in artistic poster design, film and television production, and video communication.

Image-based image matting and synthesis refers to extracting a character or another specified foreground object from an image using an image matting technology, and synthesizing the character or the another specified foreground object into another scene image. Likewise, video-based image matting and synthesis refers to extracting a character or another specified foreground object from a video stream frame by frame using an image matting technology, and synthesizing the character or the another specified foreground object into another scene video stream in order to produce an effect of interaction between the character and the scene.

In an existing image matting and image synthesis technology, when precision of image matting and image synthesis is relatively high, generally, real-time image matting and synthesis cannot be implemented because of a relatively complex algorithm. However, when a requirement of real-time image matting and synthesis can be met using a simple estimation method, precision of synthesis is generally relatively low, and therefore, precision of a synthesized image is low.

SUMMARY

Embodiments of the present disclosure provide an image processing method and apparatus, which can improve precision of image matting and image synthesis.

According to a first aspect, an embodiment of the present disclosure provides an image processing method, including determining m boundary points of a target image, acquiring a color component of a non-boundary point in a $j^{th}$ area, where the $j^{th}$ area is a neighborhood of the $j^{th}$ boundary point in the m boundary points, $1 \leq j \leq m$, and m is a positive integer greater than or equal to 1, and performing synthesis processing according to the color component of the non-boundary point in the $j^{th}$ area, to obtain a color component of the $j^{th}$ boundary point.

With reference to the first aspect, in a first possible implementation manner of the first aspect, the determining m boundary points of a target image includes acquiring a transparency mask value of each point in the target image, and determining a point that is in the target image and whose transparency mask value meets a preset threshold condition as the boundary point.

With reference to the first possible implementation manner of the first aspect, in a second possible implementation manner of the first aspect, the acquiring a transparency mask value of each point in the target image includes acquiring a trimap value of each point in the target image, where the trimap value includes a first value, a second value, or a third value, a point whose trimap value is the first value is located in a foreground area, a point whose trimap value is the second value is located in a background area, and a point whose trimap value is the third value is located in an indeterminate area, and when a trimap value of the $i^{th}$ point in the target image is the first value or the second value, setting a transparency mask value of the $i^{th}$ point to the trimap value of the $i^{th}$ point, or when a trimap value of the $i^{th}$ point in the target image is the third value, obtaining a transparency mask value of the $i^{th}$ point according to points that are in a neighborhood of the $i^{th}$ point and whose trimap values are not the third value.

With reference to the second possible implementation manner of the first aspect, in a third possible implementation manner of the first aspect, the obtaining a transparency mask value of the $i^{th}$ point according to points that are in a neighborhood of the $i^{th}$ point and whose trimap values are not the third value includes calculating a similarity $W_{ik}$ between the $i^{th}$ point and a $k^{th}$ point, where the $k^{th}$ point is any point of the points that are in the neighborhood of the $i^{th}$ point and whose trimap values are not the third value, and performing weighted averaging processing on similarities between the $i^{th}$ point and the points that are in the neighborhood of the $i^{th}$ point and whose trimap values are not the third value, to obtain the transparency mask value of the $i^{th}$ point.

With reference to the third possible implementation manner of the first aspect, in a fourth possible implementation manner of the first aspect, the calculating a similarity $W_{ik}$ between the $i^{th}$ point and the $k^{th}$ point includes acquiring luminance components of the $i^{th}$ point and the points that are in the neighborhood of the $i^{th}$ point and whose trimap values are not the third value, and obtaining the similarity $W_{ik}$ according to the luminance component of the $i^{th}$ point and a luminance component of the $k^{th}$ point by means of calculation, or acquiring luminance components and color components of the $i^{th}$ point and the points that are in the neighborhood of the $i^{th}$ point and whose trimap values are not the third value, and obtaining the similarity $W_{ik}$ according to luminance-color joint components of the $i^{th}$ point and the $k^{th}$ point by means of calculation.

With reference to the first aspect, in a fifth possible implementation manner of the first aspect, the determining m boundary points of a target image includes acquiring a trimap value of each point in the target image, and determining a point that is in the target image and whose trimap value is a third value as the boundary point.

With reference to the second to fifth possible implementation manners of the first aspect, in a sixth possible implementation manner of the first aspect, the acquiring a trimap value of each point in the target image includes performing weighted averaging processing on the color components of the $i^{th}$ point in the target image to obtain a weighted average value of the $i^{th}$ point, where when the weighted average value of the $i^{th}$ point is greater than a second threshold, the trimap value of the $i^{th}$ point is the first value, or when the weighted average value of the $i^{th}$ point is less than a first threshold, the trimap value of the $i^{th}$ point is the second value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, the trimap value of the $i^{th}$ point is the third value, where the second threshold is greater than the first threshold.

With reference to the second to fifth possible implementation manners of the first aspect, in a seventh possible implementation manner of the first aspect, the acquiring a trimap value of each point in the target image further includes, when the trimap value of the $i^{th}$ point is the first value and a point whose trimap value is the second value exists in the neighborhood of the $i^{th}$ point, setting the trimap value of the $i^{th}$ point to the third value, or when the trimap value of the $i^{th}$ point is the second value and a point whose trimap value is the first value exists in the neighborhood of the $i^{th}$ point, setting the trimap value of the $i^{th}$ point to the third value, or when the trimap value of the $i^{th}$ point is the third value and a point whose trimap value is the first value or a point whose trimap value is the second value does not exist in the neighborhood of the $i^{th}$ point, setting the trimap value of the $i^{th}$ point to the second value.

With reference to the first aspect or the first to seventh possible implementation manners of the first aspect, in an eighth possible implementation manner of the first aspect, before the acquiring a color component of a non-boundary point in a $i^{th}$ area, the method further includes converting the target image into a color space format with a luminance component.

With reference to the first aspect or the first to eighth possible implementation manners of the first aspect, in a ninth possible implementation manner of the first aspect, the acquiring a color component of a non-boundary point in a $j^{th}$ area includes, when the target image is in a luminance and chrominance component (YUV) space format, acquiring a U component and a V component of the non-boundary point in the $j^{th}$ area, or when the target image is in a lightness and color-opponent a and b dimensions (Lab) space format, acquiring an a component and a b component of the non-boundary point in the $j^{th}$ area, or when the target image is in a hue saturation and value (HSV) space format, acquiring an H component of the non-boundary point in the $j^{th}$ area.

According to a second aspect, an embodiment of the present disclosure provides an image processing apparatus, including: a determining module, where the determining module is configured to determine m boundary points of a target image, an acquiring module, where the acquiring module is configured to acquire a color component of a non-boundary point in a $j^{th}$ area, where the $j^{th}$ area is a neighborhood of the $j^{th}$ boundary point in the m boundary points, $1 \leq j \leq m$, and m is a positive integer greater than or equal to 1, and a synthesis module configured to perform synthesis processing according to the color component of the non-boundary point in the $i^{th}$ area, to obtain a color component of the $j^{th}$ boundary point.

With reference to the second aspect, in a first possible implementation manner of the second aspect, the determining module includes a first acquiring unit, where the first acquiring unit is configured to acquire a transparency mask value of each point in the target image, and a first determining unit, where the first determining unit is configured to determine a point that is in the target image and whose transparency mask value acquired by the first acquiring unit meets a preset threshold condition as the boundary point.

With reference to the first possible implementation manner of the second aspect, in a second possible implementation manner of the second aspect, the determining module further includes a second acquiring unit, where the second acquiring unit is configured to acquire a trimap value of each point in the target image, where the trimap value includes a first value, a second value, or a third value, a point whose trimap value is the first value is located in a foreground area, a point whose trimap value is the second value is located in a background area, and a point whose trimap value is the third value is located in an indeterminate area, and a second determining unit, where the second determining unit is configured to, when a trimap value of the $i^{th}$ point in the target image is the first value or the second value, set a transparency mask value of the $i^{th}$ point to the trimap value of the $i^{th}$ point, or when a trimap value of the $i^{th}$ point in the target image is the third value, obtain a transparency mask value of the $i^{th}$ point according to points that are in a neighborhood of the $i^{th}$ point and whose trimap values are not the third value.

With reference to the second possible implementation manner of the second aspect, in a third possible implementation manner of the second aspect, the second acquiring unit is further configured to perform weighted averaging processing on color components of the $i^{th}$ point in the target image to obtain a weighted average value of the $i^{th}$ point, and when the weighted average value of the $i^{th}$ point is greater than a second threshold, set the trimap value of the $i^{th}$ point to the first value, or when the weighted average value of the $i^{th}$ point is less than a first threshold, set the trimap value of the $i^{th}$ point to the second value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, set the trimap value of the $i^{th}$ point to the third value, where the second threshold is greater than the first threshold.

With reference to the second or third possible implementation manner of the second aspect, in a fourth possible implementation manner of the second aspect, the second acquiring unit further includes a credibility processing unit, and the credibility processing unit is configured to, when the trimap value of the $i^{th}$ point is the first value and a point whose trimap value is the second value exists in the neighborhood of the $i^{th}$ point, set the trimap value of the $i^{th}$ point to the third value, or when the trimap value of the $i^{th}$ point is the second value and a point whose trimap value is the first value exists in the neighborhood of the $i^{th}$ point, set the trimap value of the $i^{th}$ point to the third value, or when the trimap value of the $i^{th}$ point is the third value and a point whose trimap value is the first value or a point whose trimap value is the second value does not exist in the neighborhood of the $i^{th}$ point, set the trimap value of the $i^{th}$ point to the second value.

With reference to the second to fourth possible implementation manners of the second aspect, in a fifth possible implementation manner of the second aspect, when the second determining unit determines that the trimap value of the $i^{th}$ point in the target image is the third value, the second determining unit is further configured to calculate a similarity $W_{ik}$ between the $i^{th}$ point and the $k^{th}$ point, where the $k^{th}$ point is any point of the points that are in the neighborhood of the $i^{th}$ point and whose trimap value is not the third value, and perform weighted averaging processing on similarities between the $i^{th}$ point and the points that are in the neighborhood of the $i^{th}$ point and whose trimap values are not the third value, to obtain the transparency mask value of the $i^{th}$ point.

With reference to the fifth possible implementation manner of the second aspect, in a sixth possible implementation manner of the second aspect, the second determining unit is further configured to acquire luminance components of the $i^{th}$ point and the points that are in the neighborhood of the $i^{th}$ point and whose trimap values are not the third value, and obtain the similarity $W_{ik}$ according to the luminance component of the $i^{th}$ point and a luminance component of the $k^{th}$ point by means of calculation, or acquire luminance components and color components of the $i^{th}$ point and the points that are in the neighborhood of the $i^{th}$ point and whose trimap values are not the third value, and obtain the similarity $W_{ik}$ according to luminance-color joint components of the $i^{th}$ point and the $k^{th}$ point by means of calculation.

With reference to the second aspect, in a seventh possible implementation manner of the second aspect, the determining module includes a third acquiring unit, where the third acquiring unit is configured to acquire a trimap value of each point in the target image, and a third determining unit, where the third determining unit is configured to determine a point that is in the target image and whose trimap value is a third value as the boundary point.

With reference to the seventh possible implementation manner of the second aspect, in an eighth possible implementation manner of the second aspect, the third acquiring unit is further configured to perform weighted averaging processing on color components of the $i^{th}$ point in the target image to obtain a weighted average value of the $i^{th}$ point, and when the weighted average value of the $i^{th}$ point is greater than a second threshold, set the trimap value of the $i^{th}$ point to the first value, or when the weighted average value of the $i^{th}$ point is less than a first threshold, set the trimap value of the $i^{th}$ point to the second value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, set the trimap value of the $i^{th}$ point to the third value, where the second threshold is greater than the first threshold.

With reference to the seventh or eighth possible implementation manner of the second aspect, in a ninth possible implementation manner of the second aspect, the third acquiring unit further includes a credibility processing unit, and the credibility processing unit is configured to, when the trimap value of the $i^{th}$ point is the first value and a point whose trimap value is the second value exists in a neighborhood of the $i^{th}$ point, set the trimap value of the $i^{th}$ point to the third value, or when the trimap value of the $i^{th}$ point is the second value and a point whose trimap value is the first value exists in a neighborhood of the $i^{th}$ point, set the trimap value of the $i^{th}$ point to the third value, or when the trimap value of the $i^{th}$ point is the third value and a point whose trimap value is the first value or a point whose trimap value is the second value does not exist in a neighborhood of the $i^{th}$ point, set the trimap value of the $i^{th}$ point to the second value.

With reference to the second aspect or the first to ninth possible implementation manners of the second aspect, in a tenth possible implementation manner of the second aspect, the apparatus further includes a conversion module, where the conversion module is configured to, before the acquiring module acquires the color component of the non-boundary point in the neighborhood of the $j^{th}$ boundary point in the m boundary points, convert the target image into a color space format with a luminance component.

With reference to the second aspect or the first to tenth possible implementation manners of the second aspect, in an eleventh possible implementation manner of the second aspect, the acquiring module is further configured to, when the target image is in a YUV space format, acquire a U component and a V component of the non-boundary point in the $j^{th}$ area, or when the target image is in a Lab space format, acquire an a component and a b component of the non-boundary point in the $j^{th}$ area, or when the target image is in an HSV space format, acquire an H component of the non-boundary point in the $j^{th}$ area.

The embodiments of the present disclosure provide an image processing method and apparatus, which can be applied to an image matting and synthesis processing process, and can effectively avoid distortion of a synthesized image caused by imprecise estimation of an image transparency mask or a foreground image, of a synthesized image such that precision of image matting and synthesis processing can be improved.

BRIEF DESCRIPTION OF DRAWINGS

To describe the technical solutions in the embodiments of the present disclosure more clearly, the following briefly introduces the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
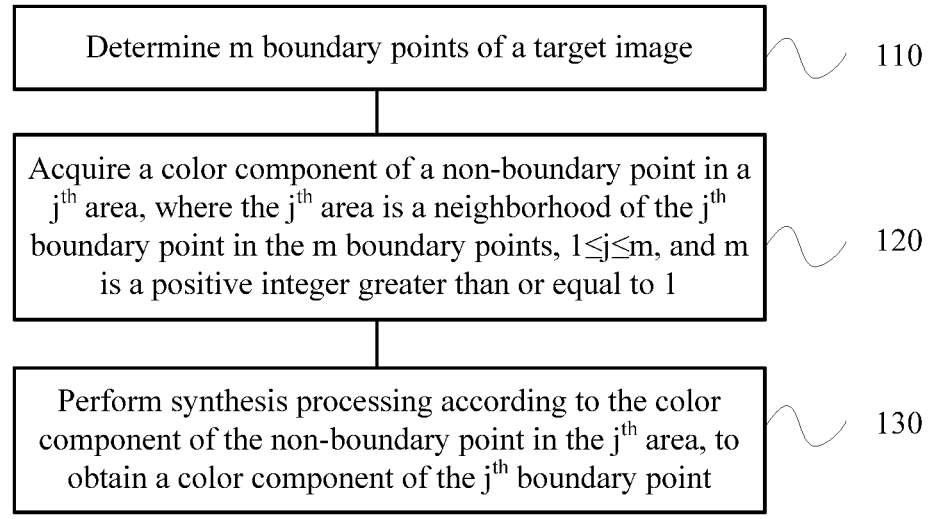
FIG. 1 is a schematic flowchart of an image processing method according to an embodiment of the present disclosure.

FIG. 1 is a schematic flowchart of an image processing method 100 according to an embodiment of the present disclosure. As shown in FIG. 1, the method 100 includes the following steps.

Step 110: Determine m boundary points of a target image.

Step 120: Acquire a color component of a non-boundary point in a $j^{th}$ area, where the $j^{th}$ area is a neighborhood of the $j^{th}$ boundary point in the m boundary points, 1≤j≤m, and m is a positive integer greater than or equal to 1.

Step 130: Perform synthesis processing according to the color component of the non-boundary point in the $j^{th}$ area, to obtain a color component of the $j^{th}$ boundary point.

This embodiment of the present disclosure provides an image processing method, which can be applied to an image matting and synthesis processing process, and can effectively avoid distortion of a synthesized image caused by imprecise estimation of an image transparency mask or a foreground image, of a synthesized image such that precision of image matting and synthesis processing can be improved.

In step 120, after step 110, it is determined that the target image has m boundary points, the $j^{th}$ boundary point may be any point in the m boundary points, and a point, except the boundary points, that exists in the neighborhood of the $j^{th}$ boundary point is referred to as a non-boundary point. The neighborhood of the $j^{th}$ boundary point refers to a preset window area that includes the $j^{th}$ boundary point. For example, the preset window area may be an area that includes the $j^{th}$ boundary point and whose size is M×N. It should be understood that the preset window area may also be set to an area of another size and another shape, and the present disclosure is not limited thereto. Therefore, for example, the acquiring a color component of a non-boundary point in a $j^{th}$ area means that if the preset window area that includes the $j^{th}$ boundary point has s non-boundary points, color components of the s non-boundary points need to be acquired.

Optionally, in an embodiment of the present disclosure, before the acquiring a color component of a non-boundary point in a $j^{th}$ area, the method further includes converting the target image into a color space format with a luminance component. For example, when the target image is in an red green blue (RGB) space format, an red green blue alpha (RGBA) space format, or a blue green red (BGR) space format, the target image needs to be first converted into a color space format with a luminance component (or referred to as a luminance path), or for example, a YUV space format, a Lab space format, or an HSV space format, and the present disclosure is not limited thereto.

For example, when the target image is an image in the RGB space format, the image in the RGB space format may be converted into the color space format with the luminance component (or referred to as the luminance path) using the following formula (1):

$$Y=0.257\times R+0.504\times G+0.098\times B+16$$
$$U=-0.148\times R-0.291\times G+0.439\times B+128$$
$$V=0.439\times R-0.368\times G-0.071\times B+128 \quad (1)$$

It should be understood that when the target image is not in the color space format with the luminance component (or referred to as the luminance path), the target image may be converted into a space format with a color component using an empirical formula.

Optionally, in an embodiment of the present disclosure, the acquiring a color component of a non-boundary point in a $j^{th}$ area includes, when the target image is in the YUV space format, acquiring a U component and a V component of the non-boundary point in the $j^{th}$ area, or when the target image is in the Lab space format, acquiring an a component and a b component of the non-boundary point in the $j^{th}$ area, or when the target image is in the HSV space format, acquiring an H component of the non-boundary point in the $j^{th}$ area. It should be understood that the target image may further be an image in another format with a color component, and the present disclosure is not limited thereto.

Optionally, in an embodiment of the present disclosure, the determining m boundary points of a target image includes: acquiring a transparency mask value of each point in the target image; and determining a point whose transparency mask value meets a preset threshold condition as the foregoing boundary point. A transparency mask a that represents the transparency mask value of each point in the target image may be obtained by means of manual inputting or inputting by a third party, or may be obtained by means of estimation in another manner, and the present disclosure is not limited thereto. Furthermore, for any point a(i,j) in the transparency mask a of the target image, if a value of the point a(i,j) meets a preset threshold condition, for example, the preset threshold condition is that the value of the point a(i,j) is located within an interval (T1, T2), the point a(i,j) is determined as the boundary point. A specific formula may be described in a formula (2):

$$E(i,j) = \begin{cases} 1 & T1 < a(i,j) < T2 \\ 0 & \text{else} \end{cases} \quad (2)$$

It should be understood that, in the formula (2), a point with E(i,j)=1 is a boundary point, a point with E(i,j)=0 is a non-boundary point, and a quantity of boundary points may be determined by setting values of T1 and T2 in the preset threshold condition. For example, for an 8-bit mask, T1 may be set to 0-50, and T2 may be set to 200-255, that is, a size of a boundary area may be adjusted, where the boundary area refers to an area that includes all boundary points. It should be understood that the foregoing formula and value examples are merely exemplary, and the present disclosure is not limited thereto.

Optionally, in an embodiment of the present disclosure, the acquiring a transparency mask value of each point in the target image includes: acquiring a trimap value of each point in the target image, where the trimap value includes a first value, a second value, or a third value, a point whose trimap value is the first value is located in a foreground area, a point whose trimap value is the second value is located in a background area, and a point whose trimap value is the third value is located in an indeterminate area, and when a trimap value of the $i^{th}$ point in the target image is the first value or the second value, setting a transparency mask value of the $i^{th}$ point to the trimap value of the $i^{th}$ point, or when a trimap value of the $i^{th}$ point in the target image is the third value, obtaining a transparency mask value of the $i^{th}$ point by means of synthesis according to a trimap value of a point that is in an $i^{th}$ area and whose trimap value is not the third value, where the $i^{th}$ area is a neighborhood of the $i^{th}$ point, and a trimap is used to mark a foreground and a background by means of segmentation. When the trimap value is the first value, it indicates a foreground area, when the trimap value is the second value, it indicates a background area, and when the trimap value is the third value, it indicates an indeterminate area. For example, for an 8-bit image, when the trimap value is a first value 255, it indicates a foreground area. When the trimap value is a second value 0, it indicates a background area. When the trimap value is a third value 127, it indicates an indeterminate area. It should be understood that values in this embodiment of the present disclosure are merely exemplary, and the present disclosure is not limited thereto.

Further, the trimap is first manually input or input by a third party, for a point that is in the target image and whose trimap value is the first value or the second value, a transparency mask value corresponding to the point is obtained by directly assigning the trimap value of the point to the transparency mask value corresponding to the point. For a point that is in the target image and whose trimap value is the third value, a transparency mask value of the point is obtained by synthesizing trimap values of points that are in a neighborhood centering on the point and whose trimap values are the third value. It should be noted that the neighborhood of the $i^{th}$ point herein refers to a preset window area that includes the $i^{th}$ point. For example, the preset window area may be an area that includes the $i^{th}$ point and whose size is M×N. It should be understood that a size of the neighborhood of the $i^{th}$ point may be the same as or different from that of the neighborhood of the $j^{th}$ boundary point. Likewise, the preset window area may also be set to an area of another size and another shape, and the present disclosure is not limited thereto.

Optionally, in an embodiment of the present disclosure, the obtaining a transparency mask value of the $i^{th}$ point by means of synthesis according to trimap values of points that are in a neighborhood of the $i^{th}$ point and whose trimap values are not the third value includes calculating a similarity $W_{ik}$ between the $i^{th}$ point and the $k^{th}$ point, to obtain the transparency mask value of the $i^{th}$ point, where the $k^{th}$ point is any one of n points that are in the $i^{th}$ area and whose trimap values are not the third value, $1 \le k \le n$, and n is a positive integer greater than or equal to 1, and performing weighted averaging processing on similarities between the $i^{th}$ point and the points that are in the neighborhood of the $i^{th}$ point and whose trimap values are not the third value, to obtain the transparency mask value of the $i^{th}$ point.

Optionally, in an embodiment of the present disclosure, the calculating a similarity between the $i^{th}$ point and the $k^{th}$ point includes: acquiring luminance components of the $i^{th}$ point and the points that are in the neighborhood of the $i^{th}$ point and whose trimap values are not the third value, and obtaining the similarity $W_{ik}$ according to the luminance component of the $i^{th}$ point and a luminance component of the $k^{th}$ point by means of calculation, or acquiring luminance components and color components of the $i^{th}$ point and the points that are in the neighborhood of the $i^{th}$ point and whose trimap values are not the third value, and obtaining the similarity $W_{ik}$ according to luminance-color joint components of the $i^{th}$ point and the $k^{th}$ point by means of calculation.

For example, if the luminance component of the $i^{th}$ point is $Y_i$, and the luminance component of the $k^{th}$ point is $Y_k$, $W_{ik}$ may be calculated using a formula (3).

$$W(x,y)=e^{-(x-y)^2/(2\sigma^2)} \quad (3)$$

Therefore, a luminance similarity $W_{ik}=e^{-(Y_i-Y_k)^2/(2\sigma^2)}$ may be obtained.

Further, if the color components of the $i^{th}$ point are respectively $U_i$ and $V_i$, and the color components of the $k^{th}$ point are respectively $U_k$ and $V_k$, a weighted average value of color components of a point may be calculated by introducing a weighting formula (4):

$$X=a\times U+b\times V \quad (4);$$

where values of a and b are, optionally, a=1 and b=1.

Then, $X_i=a\times U_i+b\times V_i$, and $X_k=a\times U_k+b\times V_k$. Therefore, a luminance-color joint component may be obtained.

$$W_{ik}=e^{-(Y_i-Y_k)^2/(2\sigma^2)} \times e^{-(X_i-X_k)^2/(2\sigma^2)}$$

Further, if a transparency mask of the $i^{th}$ point is $a_i$, $Q_i$ indicates the neighborhood of the $i^{th}$ point, and trimap(k) indicates a trimap value of the $k^{th}$ point, the transparency mask value of the $i^{th}$ point is obtained by performing weighted averaging processing on similarities between the $i^{th}$ point and the foregoing n points whose trimap values are not the third value. When the similarity is calculated according to only the luminance component, $a_i$ may be obtained using the following formula (5).

$$a_i = \frac{\sum_{k \in Q_i} W(Y_i, Y_k) \times \mathrm{Trimap}(k)}{\sum_{k \in Q_i} W(Y_i, Y_k)} \quad (5)$$

When the similarity is calculated according to the luminance-color joint component, $a_i$ may be obtained using the following formula (6):

$$a_i = \frac{\sum_{k \in Q_i} W(Y_i, Y_k) \times W(X_i, X_k) \times \mathrm{Trimap}(k)}{\sum_{k \in Q_i} W(Y_i, Y_k) \times W(X_i, X_k)} \quad (6)$$

It should be understood that, in this embodiment of the present disclosure, an optional method for calculating a transparency mask of the target image is not limited to being applied to a specific scenario of this embodiment of the present disclosure, and may be applied to any scenario in which a transparency mask needs to be calculated.

Optionally, in an embodiment of the present disclosure, the determining m boundary points of a target image includes acquiring a trimap value of each point in the target image, and determining a point whose trimap value is a third value as the foregoing boundary point.

Optionally, in an embodiment of the present disclosure, the acquiring a trimap value of each point in the target image includes: performing weighted averaging processing on color components of the $i^{th}$ point in the target image to obtain a weighted average value of the $i^{th}$ point, where when the weighted average value of the $i^{th}$ point is greater than a second threshold, the trimap value of the $i^{th}$ point is the first value, or when the weighted average value of the $i^{th}$ point is less than a first threshold, the trimap value of the $i^{th}$ point is the second value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, the trimap value of the $i^{th}$ point is the third value, where the second threshold is greater than the first threshold.

Further, the weighted average value of the color components of the $i^{th}$ point in the target image may be calculated using the following formula (4):

$$X=a\times U+b\times V \quad (4)$$

A U component and a V component are chrominance components of YUV space, and a and b are weight constants, for example, values of both a and b may be set to 1. Further, after the weighted average value $X_i$ of the $i^{th}$ point is obtained by means of calculation using the formula (4), $X_i$ is separately compared with a first threshold T1 and a second threshold T2, and if a value of $X_i$ is greater than T2, the trimap value of the $i^{th}$ point is the first value. If a value of $X_i$ is less than T1, the trimap value of the $i^{th}$ point is the second value. If a value of $X_i$ is greater than or equal to T1 and less than or equal to T2, the trimap value of the $i^{th}$ point is the third value. An 8-bit image is used as an example. When $a=b=1$, $X_i=U_i+V_i$, T1=230, and T2=250. It should be understood that the foregoing values are merely exemplary, and the present disclosure is not limited thereto.

Optionally, in an embodiment of the present disclosure, acquiring a trimap of the target image further includes, when the trimap value of the $i^{th}$ point is the first value and a point whose trimap value is the second value exists in the neighborhood of the $i^{th}$ point, setting the trimap value of the $i^{th}$ point to the third value, or when the trimap value of the $i^{th}$ point is the second value and a point whose trimap value is the first value exists in the neighborhood of the $i^{th}$ point, setting the trimap value of the $i^{th}$ point to the third value, or when the trimap value of the $i^{th}$ point is the third value and a point whose trimap value is the first value or a point whose trimap value is the second value does not exist in the neighborhood of the $i^{th}$ point, setting the trimap value of the $i^{th}$ point to the second value.

Further, the neighborhood of the $i^{th}$ point refers to a preset window area that includes the $i^{th}$ point. For example, the preset window area may be an area that includes the $i^{th}$ boundary point and whose size is M×N, and a shape of the neighborhood of the $i^{th}$ point is not limited in the present disclosure.

Optionally, in an embodiment of the present disclosure, a synthesis method that may be used for obtaining the color component of the $j^{th}$ boundary point by means of synthesis according to the color component of the non-boundary point in the $j^{th}$ area may be a weighted averaging method, a median filtering method, a non-local averaging method, or the like, and the present disclosure is not limited thereto.

Further, when the weighted averaging method is used to obtain the color component of the $j^{th}$ boundary point by means of synthesis, the following formula (7) may be used to calculate a U component and a V component of the $j^{th}$ boundary point that uses (x', y') as coordinates, where coordinates of a non-boundary point 1 located in an $i^{th}$ area $D_j$ are (x, y).

$$U(x', y') = \frac{\sum_{(x,y)\in D_j} W(x, y, x', y')U(x, y)}{\sum_{(x,y)\in D_j} W(x, y, x', y')}$$

$$V(x', y') = \frac{\sum_{(x,y)\in D_j} W(x, y, x', y')V(x, y)}{\sum_{(x,y)\in D_j} W(x, y, x', y')}$$

$$W(x, y, x', y') = \begin{cases} e^{-((x-x')^2+(y-y')^2)/2\sigma^2} & E(x, y) = 1 \\ 0 & E(x, y) = 0 \end{cases}$$

(7)

This embodiment of the present disclosure provides an image processing method, which can be applied to an image matting and synthesis processing process, and can effectively avoid distortion of a synthesized image caused by imprecise estimation of an image transparency mask or a foreground image such that precision of image matting and synthesis processing can be improved.

Figure 2:
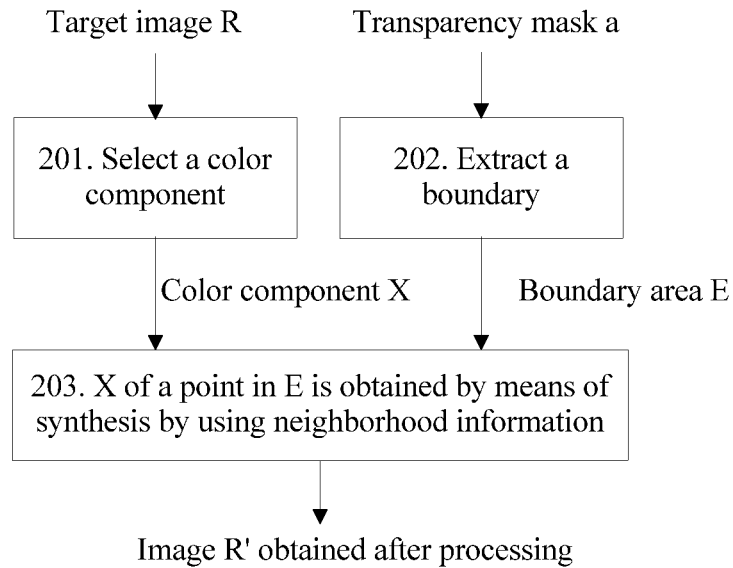
FIG. 2 is a schematic flowchart of an image processing method according to another embodiment of the present disclosure.

FIG. 2 is a schematic flowchart of an image processing method according to another embodiment of the present disclosure. As shown in FIG. 2, first, a target image R and a transparency mask a of the target image need to be input. In step 201, a color component of each point in the target image R needs to be extracted, that is, a component that does not represent luminance is extracted from the target image R. In step 202, a boundary area E of the target image is determined according to the transparency mask a, and a point that is in the boundary area E and has only a color component is denoted as a point P. In step 203, a color component X of the point P in the boundary area E is obtained by synthesizing color components of n points outside the boundary area E. It should be understood that the method in this embodiment of the present disclosure may be implemented corresponding to the method provided in the embodiment in FIG. 1, and details are not described herein again.

Further, for a point in the target image R, if a value of a transparency mask a of the point is within a preset interval (T1, T2), the point is a boundary point, and a specific formula (8) is described as follows.

$$E(i, j) = \begin{cases} 1 & T1 < a(i, j) < T2 \\ 0 & \text{else} \end{cases}$$

(8)

It should be understood that, in the formula (8), a point with E(i,j)=1 is a boundary point, a point with E(i,j)=0 is a non-boundary point, and a quantity of boundary points may be determined by setting values of T1 and T2 in a preset threshold condition. For example, for an 8-bit mask, T1 may be set to 0-50, and T2 may be set to 200-255, that is, a size of a boundary area may be adjusted, where the boundary area refers to an area that includes all boundary points. It should be understood that the foregoing formula and value examples are merely exemplary, and the present disclosure is not limited thereto.

Optionally, in an embodiment of the present disclosure, before the color component of each point in the target image R is extracted, when the target image R is in an RGB format, an RGBA format, a BGR format, or the like, the target image R needs to be first converted into a color space format with a luminance component, such as YUV space, Lab space, or HSV space. Taking the YUV space for example, color components that do not represent luminance are selected, that is, a U component and a V component, and the present disclosure is not limited thereto.

Optionally, in an embodiment of the present disclosure, n points outside the boundary area E may be points that are in a preset window area centering on the point P and that do not belong to E. For example, a point that is in a neighborhood centering on the point P and with a size of M×N and that does not belong to the boundary area E may be selected. A method for synthesizing color components of the point P may be a weighted averaging method, a median filtering method, a non-local method, or the like, and the present disclosure is not limited thereto.

This embodiment of the present disclosure provides an image processing method, which can be applied to an image matting and synthesis processing process, and can effectively avoid distortion of a synthesized image caused by imprecise estimation of an image transparency mask or a foreground image such that precision of image matting and synthesis processing can be improved.

Figure 3:
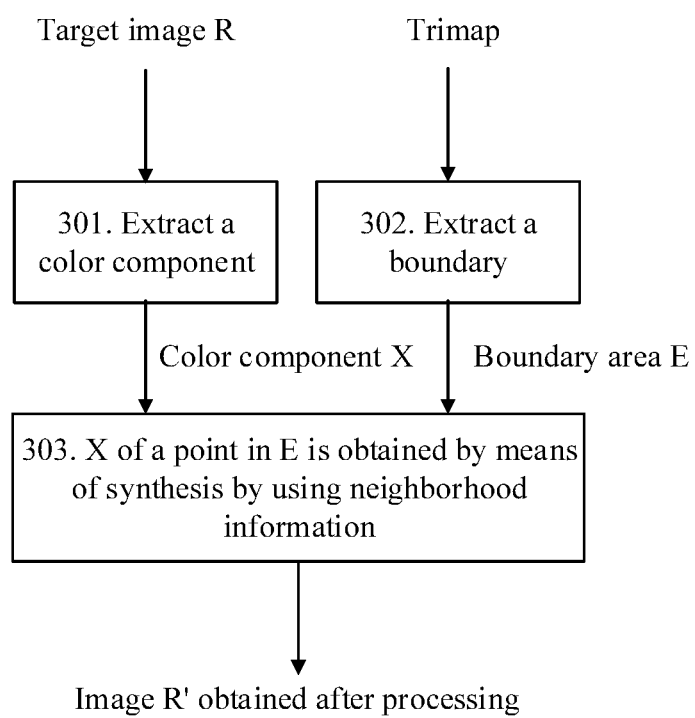
FIG. 3 is a schematic flowchart of an image processing method according to still another embodiment of the present disclosure.

FIG. 3 is a schematic flowchart of an image processing method according to another embodiment of the present disclosure. As shown in FIG. 3, a target image R and a trimap of the target image need to be input first. In step 301, a color component of each point in the target image R needs to be extracted, that is, a component that does not represent luminance is extracted from the target image R. In step 302, a boundary area E of the target image is determined according to the trimap, and a point that is in the boundary area E and has only a color component is denoted as a point P. In step 303, a color component X of the point P in the boundary area E is obtained by synthesizing color components of n points outside the boundary area E.

Further, for a point in the target image R, if a trimap value of the point is a third value T3, the point is a boundary point, and a specific formula (9) is described as follows.

$$E(i, j) = \begin{cases} 1 & \text{Trimap}(i, j) = T3 \\ 0 & \text{else} \end{cases} \quad (9)$$

It should be understood that a specific implementation process of this embodiment may be implemented using the method provided in the embodiment in FIG. 1 or FIG. 2. For brevity, details are not described herein again.

This embodiment of the present disclosure provides an image processing method, which can be applied to an image matting and synthesis processing process, and can effectively avoid distortion of a synthesized image caused by imprecise estimation of an image transparency mask or a foreground image such that precision of image matting and synthesis processing can be improved.

Figure 4:
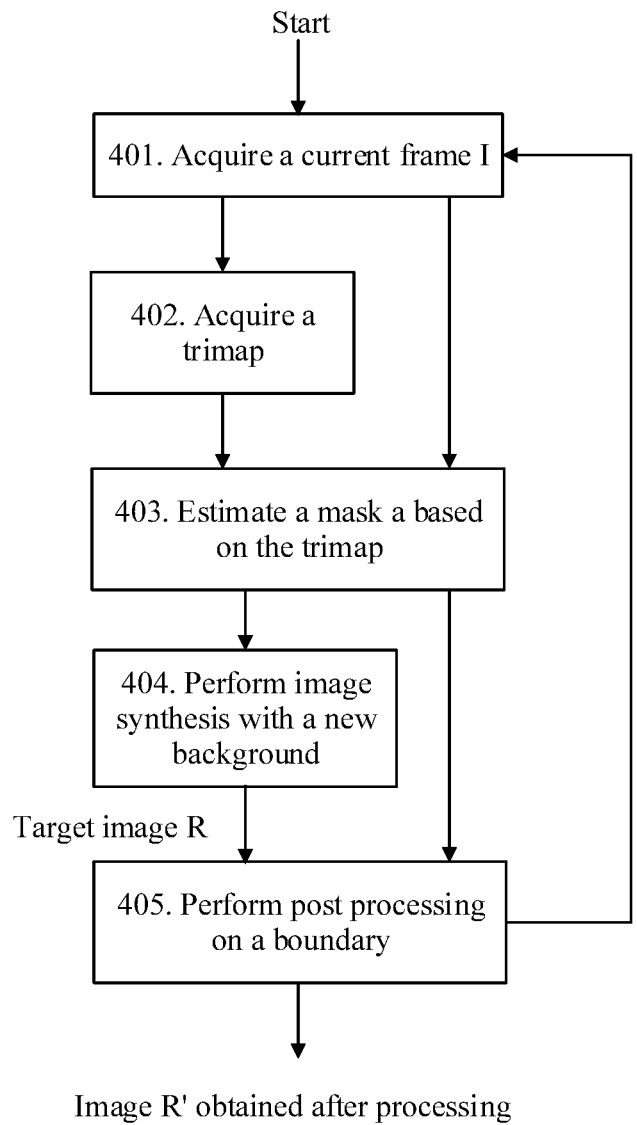
FIG. 4 is a schematic flowchart of an image processing method according to another embodiment of the present disclosure.

FIG. 4 is a schematic flowchart of an image processing method according to another embodiment of the present disclosure. As shown in FIG. 4, the method includes the following steps.

Step 401: Acquire a current frame I. During real-time processing on an image for a video, the current frame I needs to be collected directly from a camera sensor or acquired locally or from a network. It should be noted that, if the current frame I is not in a luminance-chrominance space format, the current frame further needs to be converted into a color space format with a luminance component.

Step 402: Automatically acquire a trimap based on the current frame.

Optionally, a specific method for acquiring the trimap may be the method shown in the embodiment in FIG. 1. In an embodiment of the present disclosure, acquiring the trimap of the current frame I includes performing weighted averaging processing on color components of the $i^{th}$ point in the current frame I, to obtain a weighted average value of the $i^{th}$ point; or when the weighted average value of the $i^{th}$ point is less than a first threshold, a trimap value of the $i^{th}$ point is a second value, where when the weighted average value of the $i^{th}$ point is greater than a second threshold, a trimap value of the $i^{th}$ point is a first value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, a trimap value of the $i^{th}$ point is the third value, where the second threshold is greater than the first threshold.

The weighted average value of the color component of the $i^{th}$ point in the target image may be calculated using the following formula (10):

$$X = a \times U + b \times V \quad (10)$$

A U component and a V component are chrominance components of YUV space, and a and b are weight constants, for example, values of both a and b may be set to 1. After the weighted average value $X_i$ of the $i^{th}$ point is obtained by means of calculation using the formula (10), $X_i$ is separately compared with a first threshold T1 and a second threshold T2, and if a value of $X_i$ is greater than T2, the trimap value of the $i^{th}$ point is the first value. If a value of $X_i$ is less than T1, the trimap value of the $i^{th}$ point is the second value. If a value of $X_i$ is greater than or equal to T1 and less than or equal to T2, the trimap value of the $i^{th}$ point is the third value. An 8-bit image is used as an example. When a=b=1, $X_i = U_i + V_i$, T1=230, and T2=250. It should be understood that the foregoing values are merely exemplary, and the present disclosure is not limited thereto.

Step 403: Estimate a transparency mask a based on the trimap.

Optionally, a specific method for acquiring the trimap may be the method shown in the embodiment in FIG. 1. In an embodiment of the present disclosure, acquiring the transparency mask of the current frame I includes acquiring a trimap value of each point in the current frame I; and when a trimap value of the $i^{th}$ point in the current frame I is the first value or the second value, setting a transparency mask value of the $i^{th}$ point to the trimap value of the $i^{th}$ point; or when a trimap value of the $i^{th}$ point in the current frame I is the third value, obtaining a transparency mask value of the $i^{th}$ point by means of synthesis according to trimap values of points that are in an $i^{th}$ area and whose trimap values are not the third value, where the $i^{th}$ area is a neighborhood of the $i^{th}$ point.

Further, according to the trimap acquired in step 402, for a point that is in the current frame I and whose trimap value is the first value or the second value, a transparency mask value corresponding to the point is obtained by directly assigning the trimap value of the point to the transparency mask value corresponding to the point. For a point that is in the current frame I and whose trimap value is the third value, a transparency mask value of the point is obtained by synthesizing trimap values of points that are in a neighborhood centering on the point and whose trimap values are the third value. It should be noted that the $i^{th}$ area is the neighborhood of the $i^{th}$ point, where the neighborhood of the $i^{th}$ point herein refers to a preset window area that includes the $i^{th}$ point. For example, the preset window area may be an area that includes the $i^{th}$ point and whose size is M×N. It should be understood that a size of a second preset area may be the same as or different from that of a first preset area. Likewise, the preset window area may also be set to an area of another size and another shape, and the present disclosure is not limited thereto.

Optionally, in an embodiment of the present disclosure, the obtaining a transparency mask value of the $i^{th}$ point by means of synthesis according to trimap values of points that are in an $i^{th}$ area and whose trimap values are not the third value includes calculating a similarity $W_{ik}$ between the $i^{th}$ point and the $k^{th}$ point, where the $k^{th}$ point is any one of n points that are in the $i^{th}$ area and whose trimap values are not the third value, $1 \leq k \leq n$, and n is a positive integer greater than or equal to 1, and performing weighted averaging processing on similarities between the $i^{th}$ point and the points that are in the neighborhood of the $i^{th}$ point and whose trimap values are not the third value, to obtain the transparency mask value of the $i^{th}$ point.

Optionally, in an embodiment of the present disclosure, the calculating a similarity between the $i^{th}$ point and the $k^{th}$ point includes obtaining the similarity $W_{ik}$ by means of calculation according to luminance components of the $i^{th}$ point and the $k^{th}$ point; or obtaining the similarity $W_{ik}$ according to luminance-color joint components of the $i^{th}$ point and the $k^{th}$ point by means of calculation.

Further, for example, if the luminance component of the $i^{th}$ point is $Y_i$, and the luminance component of the $k^{th}$ point is $Y_k$, $W_{ik}$ may be calculated using a formula (11).

$$W(x,y) = e^{-(x-y)^2/(2\sigma^2)} \quad (11)$$

Therefore, a luminance similarity $W_{ik} = e^{-(Y_i - Y_k)^2/(2\sigma^2)}$ may be obtained.

Furthermore, if color components of the $i^{th}$ point are respectively $U_i$ and $V_i$, and color components of the $k^{th}$ point are respectively $U_k$ and $V_k$, a weighting formula (12) may be introduced:

$$X = a \times U + b \times V \quad (12);$$

where values of a and b are, optionally, a=1 and b=1.

Then, $X_i = a \times U_i + b \times V_i$, and $X_k = a \times U_k + b \times V_k$. Therefore, a luminance-color joint component may be obtained.

$$W_{ik} = e^{-(Y_i - Y_k)^2/(2\sigma^2)} \times e^{-(X_i - X_k)^2/(2\sigma^2)}$$

Further, if a transparency mask of the $i^{th}$ point is $a_i$, $Q_i$ indicates the $i^{th}$ area, and trimap(k) indicates a trimap value of the $k^{th}$ point, the transparency mask value of the $i^{th}$ point is obtained by performing weighted averaging processing on similarities between the $i^{th}$ point and the foregoing n points whose trimap values are not the third value. When the similarity is calculated according to only the luminance component, $a_i$ may be obtained using the following formula (13).

$$a_i = \frac{\sum_{k \in Q_i} W(Y_i, Y_k) \times \mathrm{Trimap}(k)}{\sum_{k \in Q_i} W(Y_i, Y_k)} \quad (13)$$

When the similarity is calculated according to the luminance-color joint component, $a_i$ may be obtained using the following formula (14):

$$a_i = \frac{\sum_{k \in Q_i} W(Y_i, Y_k) \times W(X_i, X_k) \times \mathrm{Trimap}(k)}{\sum_{k \in Q_i} W(Y_i, Y_k) \times W(X_i, X_k)} \quad (14)$$

It should be understood that, in this embodiment of the present disclosure, an optional method for calculating a transparency mask of the target image is not limited to being applied to a specific scenario of this embodiment of the present disclosure, and may be applied to any scenario in which a transparency mask needs to be calculated.

In step 403, a mathematical model expression (15) of image matting is as follows.

$$I = aF + (1-a)B \quad (15),$$

where I is the current frame acquired in step 401, a is the transparency mask a acquired in step 403, F is a foreground object, and B is a background.

Step 404: Synthesize with a new background (BCK). After step 403, the foreground object F and the transparency mask may be extracted from an original image using the formula (15), that is, an image matting process is implemented, and a process in which the foreground object F is inserted into another background image B' using the transparency mask a, that is, a process of completing image synthesis, may be further implemented using a formula (16).

$$R = aF + (1-a)B' \quad (16)$$

After a synthesized target image R is obtained after the foregoing steps, an abnormal synthesis result may exist in a boundary area of the target image due to imprecise or even incorrect estimation of the foreground or the transparency mask. For example, during green screen matting, a green-edge flaw may occur in a new synthesis result.

Therefore, step 405: Perform post processing on a target image R, to obtain a processed image R'. A process of performing post processing on the target image R in step 405 may be implemented using the methods shown in the embodiments in FIG. 1 to FIG. 3, and details are not described herein again.

A main problem in an existing mating and synthesis technology lies in that requirements for precision and real time cannot be met simultaneously. When estimation of a foreground and a transparency mask of an image is relatively precise, complexity of a corresponding algorithm is extremely high, and therefore, a requirement for real time cannot be met. Generally, in a matting and synthesis process that can meet the real time requirement, an obtained synthesis result may have abnormality or a flaw in the boundary area of a synthesized image.

This embodiment of the present disclosure provides an image processing method, which can effectively avoid distortion of a synthesized image caused by imprecise estimation of an image transparency mask or a foreground image such that precision of image matting and synthesis processing can be improved, complexity of an algorithm in an image processing process is reduced, and a process of real-time image matting and synthesis can be implemented.

Figure 5:
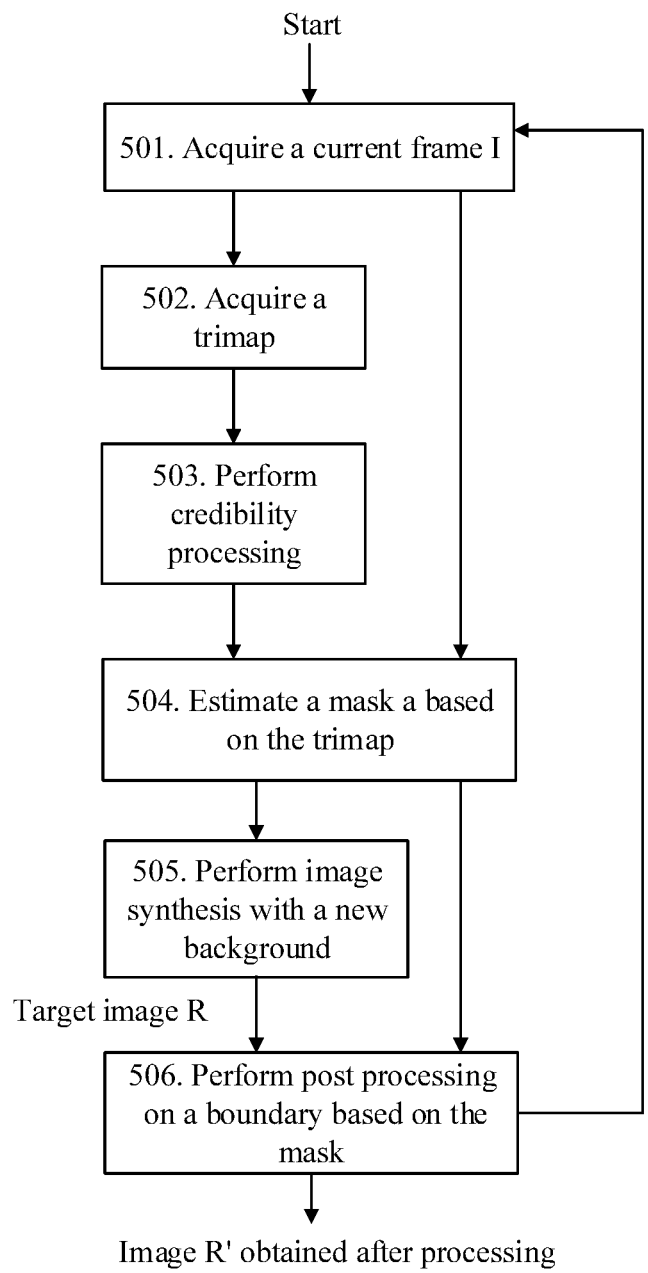
FIG. 5 is a schematic flowchart of an image processing method according to still another embodiment of the present disclosure.

FIG. 5 is a schematic flowchart of an image processing method according to another embodiment of the present disclosure. As shown in FIG. 5, the method includes the following steps.

Step 501: Acquire a current frame I. Furthermore, during real-time processing on an image for a video, the current frame I needs to be collected directly from a camera sensor or acquired locally or from a network. It should be noted that if the current frame I is not in a luminance-chrominance space format, the current frame further needs to be converted into the luminance-chrominance space format.

Step 502: Automatically acquire a trimap based on the current frame. Specific methods for acquiring the trimap may be methods shown in the embodiments in FIG. 1 to FIG. 4, and details are not described herein again.

Step 503: Perform credibility processing. Imprecision or an error may also exist in the trimap acquired in step 502. Therefore, in step 503, credibility processing is performed on the trimap obtained in step 502. Furthermore, for the $i^{th}$ point that is any point in an image, when a trimap value of the $i^{th}$ point is a first value and a point whose trimap value is a second value exists in a neighborhood of the $i^{th}$ point, the trimap value of the $i^{th}$ point is set to a third value, or when a trimap value of the $i^{th}$ point is a second value and a point whose trimap value is a first value exists in a neighborhood of the $i^{th}$ point, the trimap value of the $i^{th}$ point is set to a third value, or when a trimap value of the $i^{th}$ point is a third value and a point whose trimap value is a first value or a point whose trimap value is a second value does not exist in a neighborhood of the $i^{th}$ point, the trimap value of the $i^{th}$ point is set to the second value.

Step 504: Estimate a transparency mask a based on the trimap. A specific method for calculating the transparency mask a may be the method shown in the embodiment in FIG. 1, and details are not described herein again. A mathematical model expression (17) of image matting is as follows.

$$I = aF + (1-a)B \quad (17),$$

where I is the current frame acquired in step 501, a is the transparency mask a acquired in step 503, F is a foreground object, and B is a background.

Step 505: Synthesize with a new background (BCK). After step 503, the foreground object F and the transparency mask may be extracted from an original image, that is, an image matting process is implemented, and a process in which the foreground object F is inserted into another background image B' using the transparency mask a, that is, a process of completing image synthesis, may be further implemented using a formula (18).

$$R=aF+(1-a)B' \qquad (18)$$

After a synthesized target image R is obtained after the foregoing steps, an abnormal synthesis result may exist in a boundary area of the target image due to imprecise or even incorrect estimation of the foreground or the transparency mask. For example, during green screen matting, a flaw of green edge may occur in a new synthesis result.

Therefore, step 506: Perform post processing on a target image R, to obtain a processed image R'. A process of performing post processing on the target image R in step 507 may be implemented using the methods shown in the embodiments in FIG. 1 to FIG. 4, and details are not described herein again.

A main problem in an existing mating and synthesis technology lies in that requirements for precision and real time cannot be met simultaneously. When estimation of a foreground and a transparency mask of an image is relatively precise, complexity of a corresponding algorithm is extremely high, and therefore, a requirement for real time cannot be met. Generally, in a matting and synthesis process that can meet the real time requirement, an obtained synthesis result may have abnormality or a flaw in the boundary area of a synthesized image.

This embodiment of the present disclosure provides an image processing method, which can effectively avoid distortion of a synthesized image caused by imprecise estimation of an image transparency mask or a foreground image such that precision of image matting and synthesis processing can be improved, complexity of an algorithm in an image processing process is reduced, and a process of real-time image matting and synthesis can be implemented.

Figure 6:
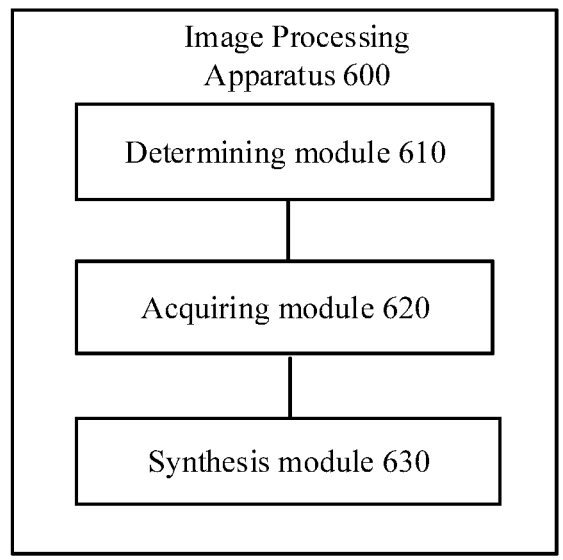
FIG. 6 is a schematic block diagram of an image processing apparatus according to another embodiment of the present disclosure.
Figure 7:
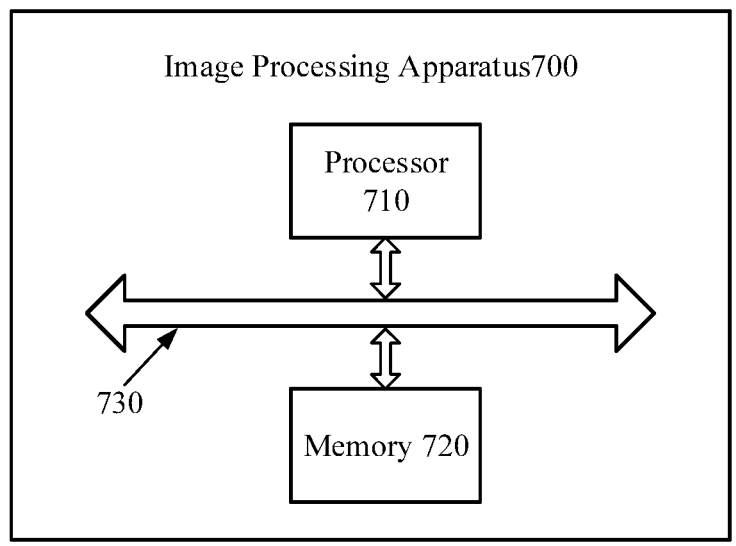
FIG. 7 is a schematic block diagram of an image processing apparatus according to an embodiment of the present disclosure.

The embodiments shown in FIG. 1 to FIG. 5 detail, from a method perspective, a specific process of processing an image. With reference to FIG. 6 to FIG. 7, the following describes an image processing apparatus according to an embodiment of the present disclosure.

It should be understood that apparatuses in FIG. 6 and FIG. 7 can be configured to implement steps of the methods in FIG. 1 to FIG. 5. For brevity, details are not described herein again.

FIG. 6 is a schematic block diagram of an image processing apparatus 600 according to an embodiment of the present disclosure. As shown in FIG. 6, the apparatus 600 includes a determining module 610, an acquiring module 620, and a synthesis module 630.

The determining module 610 is configured to determine m boundary points of a target image.

The acquiring module 620 is configured to acquire a color component of a non-boundary point in a $j^{th}$ area, where the $j^{th}$ area is a neighborhood of the $j^{th}$ boundary point in the m boundary points, $1 \leq j \leq m$, and m is a positive integer that is greater than or equal to 1.

The synthesis module 630 is configured to perform synthesis processing according to the color component of the non-boundary point in the $j^{th}$ area, to obtain a color component of the $j^{th}$ boundary point.

This embodiment of the present disclosure provides an image processing apparatus, which can be applied to an image matting and synthesis processing process, and can effectively avoid distortion of a synthesized image caused by imprecise estimation of an image transparency mask or a foreground image such that precision of image matting and synthesis processing can be improved.

Further, after the determining module 610 determines the m boundary points of the target image, the acquiring module 620 acquires the color component of the non-boundary point in the $j^{th}$ area, where the $j^{th}$ boundary point may be any point in the m boundary points, and a point, except the boundary points, that exists in the neighborhood of the $j^{th}$ boundary point is referred to as a non-boundary point; the neighborhood of the $j^{th}$ boundary point refers to a preset window area that includes the $j^{th}$ boundary point. For example, the preset window area may be an area that includes the $j^{th}$ boundary point and whose size is M×N. It should be understood that the preset window area may also be set to an area of another size and another shape, and the present disclosure is not limited thereto. Therefore, for example, the acquiring a color component of a non-boundary point in a $j^{th}$ area means that if the preset window area that includes the $j^{th}$ boundary point has s non-boundary points, color components of the s non-boundary points need to be acquired.

Optionally, in an embodiment of the present disclosure, the apparatus 600 further includes a conversion module, where the conversion module is configured to, before the acquiring module 620 acquires the color component of the non-boundary point in the neighborhood of the $j^{th}$ boundary point in the m boundary points, convert the target image into a color space format with a luminance component. For example, when the target image is in an RGB space format, an RGBA space format, or a BGR space format, the target image needs to be first converted into a color space format with a luminance component, for example, a YUV space format, a Lab space format, or an HSV space format, and the present disclosure is not limited thereto.

Further, for example, when the target image is an image in the RGB space format, the image in the RGB space format may be converted into the color space format with the luminance component using the following formula (19).

$$Y=0.257 \times R+0.504 \times G+0.098 \times B+16$$

$$U=-0.148 \times R-0.291 \times G+0.439 \times B+128$$

$$V=0.439 \times R-0.368 \times G-0.071 \times B+128 \qquad (19)$$

It should be understood that when the target image is not in the color space format with the luminance component, the target image may be converted into a space format with a color component using an empirical formula.

Optionally, in an embodiment of the present disclosure, the acquiring module 620 is further configured to, when the target image is in the YUV space format, acquire a U component and a V component of the non-boundary point in the $j^{th}$ area, or when the target image is in the Lab space format, acquire an a component and a b component of the non-boundary point in the $j^{th}$ area, or when the target image is in the HSV space format, acquire an H component of the non-boundary point in the $j^{th}$ area. It should be understood that the target image may further be an image in another format with a color component, and the present disclosure is not limited thereto.

Optionally, in an embodiment of the present disclosure, before the color component of the non-boundary point in the $j^{th}$ boundary point in the m boundary points is acquired, the conversion module is further configured to, when the target image is not in a color space format with a luminance component, convert the target image into the color space format with the luminance component.

Optionally, in an embodiment of the present disclosure, the determining module 610 further includes a first acquiring unit, where the first acquiring unit is configured to acquire a transparency mask value of each point in the target image, and a first determining unit, where the first determining unit is configured to determine a point that is in the target image and whose transparency mask value acquired by the first acquiring unit meets a preset threshold condition as the boundary point.

A transparency mask a that represents the transparency mask value of each point in the target image may be obtained by means of manual inputting or inputting by a third party, or may be obtained by means of estimation in another manner, and the present disclosure is not limited thereto. Furthermore, for any point a(i,j) in the transparency mask a of the target image, if a value of the point a(i,j) meets a preset threshold condition, for example, the preset threshold condition is that the value of the point a(i,j) is located within an interval (T1, T2), the point a(i,j) is determined as the boundary point. A specific formula may be described in a formula (20).

$$E(i, j) = \begin{cases} 1 & T1 < a(i, j) < T2 \\ 0 & \text{else} \end{cases} \quad (20)$$

It should be understood that, in the formula (20), a point with E(i,j)=1 is a boundary point, a point with E(i,j)=0 is a non-boundary point, and a quantity of boundary points may be determined by setting values of T1 and T2 in the preset threshold condition, that is, a size of a boundary area may be adjusted, where the boundary area refers to an area that includes all boundary points. For example, for an 8-bit mask, T1 may be set to 0-50, and T2 may be set to 200-255. It should be understood that the foregoing formula and value examples are merely exemplary, and the present disclosure is not limited thereto.

Optionally, in an embodiment of the present disclosure, the determining module 610 further includes a second acquiring unit, where the second acquiring unit is configured to acquire a trimap value of each point in the target image, where the trimap value includes a first value, a second value, or a third value, a point whose trimap value is the first value is located in a foreground area, a point whose trimap value is the second value is located in a background area, and a point whose trimap value is the third value is located in an indeterminate area, and a second determining unit, where the second determining unit is configured to, when a trimap value of the $i^{th}$ point in the target image is the first value or the second value, set a transparency mask value of the $i^{th}$ point to the trimap value of the $i^{th}$ point, or when a trimap value of the $i^{th}$ point in the target image is the third value, perform synthesis processing on trimap values of points that are in a neighborhood of the $i^{th}$ point and whose trimap values are not the third value, to obtain a transparency mask value of the $i^{th}$ point, where an $i^{th}$ area is a neighborhood of the $i^{th}$ point, and the trimap is used to mark a foreground and a background by means of segmentation; when the trimap value is the first value, it indicates a foreground area, when the trimap value is the second value, it indicates a background area, and when the trimap value is the third value, it indicates an indeterminate area. For example, for an 8-bit image, when the trimap value is a first value 255, it indicates a foreground area. When the trimap value is a second value 0, it indicates a background area. When the trimap value is a third value 127, it indicates an indeterminate area. It should be understood that values in this embodiment of the present disclosure are merely exemplary, and the present disclosure is not limited thereto.

The trimap is first manually input or input by a third party, for a point that is in the target image and whose trimap value is the first value or the second value, a transparency mask value corresponding to the point is obtained by directly assigning the trimap value of the point to the transparency mask value corresponding to the point. For a point that is in the target image and whose trimap value is the third value, a transparency mask of the point is obtained by synthesizing trimap values of points that are in a neighborhood centering on the point and whose trimap values are the third value. It should be noted that the neighborhood of the $i^{th}$ point herein refers to a preset window area that includes the $i^{th}$ point. For example, the preset window area may be an area that includes the $i^{th}$ point and whose size is M×N. It should be understood that a size of the neighborhood of the $i^{th}$ point may be the same as or different from that of the neighborhood of the $j^{th}$ boundary point. Likewise, the preset window area may also be set to an area of another size and another shape, and the present disclosure is not limited thereto.

Optionally, in an embodiment of the present disclosure, the second acquiring unit is further configured to perform weighted averaging processing on color components of the $i^{th}$ point in the target image to obtain a weighted average value of the $i^{th}$ point, and when the weighted average value of the $i^{th}$ point is greater than a second threshold, set the trimap value of the $i^{th}$ point to the first value; or when the weighted average value of the $i^{th}$ point is less than a first threshold, set the trimap value of the $i^{th}$ point to the second value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, set the trimap value of the $i^{th}$ point to the third value, where the second threshold is greater than the first threshold.

Further, the weighted average value of the color components of the $i^{th}$ point in the target image may be calculated using the following formula (21).

$$X = a \times U + b \times V \quad (21)$$

A U component and a V component are chrominance components of YUV space, a and b are weight constants, and values of both a and b may be set to 1. Furthermore, after $X_i$ is obtained by means of calculation using the formula (21), $X_i$ is separately compared with a first threshold T1 and a second threshold T2. If a value of $X_i$ is greater than T2, the trimap value of the $i^{th}$ point is the first value. If a value of $X_i$ is less than T1, the trimap value of the $i^{th}$ point is the second value. If a value of $X_i$ is greater than or equal to T1 and less than or equal to T2, the trimap value of the $i^{th}$ point is the third value. An 8-bit image is used as an example. When a=b=1, $X_i=U_i+V_i$, T1=230, and T2=250. It should be understood that the foregoing values are merely exemplary, and the present disclosure is not limited thereto.

Optionally, in an embodiment of the present disclosure, the second acquiring unit further includes a credibility processing unit, where the credibility processing unit is configured to, when the trimap value of the $i^{th}$ point is the first value and a point whose trimap value is the second value exists in the neighborhood of the $i^{th}$ point, set the trimap value of the $i^{th}$ point to the third value, or when the trimap value of the $i^{th}$ point is the second value and a point whose trimap value is the first value exists in the neighborhood of the $i^{th}$ point, set the trimap value of the $i^{th}$ point to the third value, or when the trimap value of the $i^{th}$ point is the third value and a point whose trimap value is the first value or a point whose trimap value is the second value does not exist in the neighborhood of the $i^{th}$ point, set the trimap value of the $i^{th}$ point to the second value.

Further, the neighborhood of the $i^{th}$ point refers to a preset window area that includes the $i^{th}$ point. For example, the preset window area may be an area that includes the $i^{th}$ boundary point and whose size is M×N, and a shape of the neighborhood of the $i^{th}$ point is not limited in the present disclosure.

Optionally, in an embodiment of the present disclosure, when the second determining unit determines that the trimap value of the $i^{th}$ point in the target image is the third value, the second determining unit is configured to calculate a similarity $W_{ik}$ between the $i^{th}$ point and the $k^{th}$ point, where the $k^{th}$ point is any point of the points that are in the neighborhood of the $i^{th}$ point and whose trimap values are not the third value, and perform weighted averaging processing on similarities between the $i^{th}$ point and the points that are in the neighborhood of the $i^{th}$ point and whose trimap values are not the third value, to obtain the transparency mask value of the $i^{th}$ point.

Optionally, in an embodiment of the present disclosure, the second determining unit is further configured to acquire luminance components of the $i^{th}$ point and the points that are in the neighborhood of the $i^{th}$ point and whose trimap values are not the third value, and obtain the similarity $W_{ik}$ according to the luminance component of the $i^{th}$ point and a luminance component of the $k^{th}$ point by means of calculation, or acquire luminance components and color components of the $i^{th}$ point and the points that are in the neighborhood of the $i^{th}$ point and whose trimap values are not the third value, and obtain the similarity $W_{ik}$ according to luminance-color joint components of the $i^{th}$ point and the $k^{th}$ point by means of calculation.

Further, for example, if the luminance component of the $i^{th}$ point is $Y_i$, and the luminance component of the $k^{th}$ point is $Y_k$, $W_{ik}$ may be calculated using a formula (22).

$$W(x,y)=e^{-(x-y)^2/(2\sigma^2)} \tag{22}$$

Therefore, a luminance similarity $W_{ik}=e^{-(Y_i-Y_k)^2/(2\sigma^2)}$ may be obtained.

Further, if color components of the $i^{th}$ point are respectively $U_i$ and $V_i$, and color components of the $k^{th}$ point are respectively $U_k$ and $V_k$, a weighting formula (23) may be introduced:

$$X=a\times U+b\times V \tag{23}$$

where values of a and b are, optionally, a=1 and b=1.

Then, $X_i=a\times U_i+b\times V_i$, and $X_k=a\times U_k+b\times V_k$. Therefore, a luminance-color joint component may be obtained:

$$W_{ik}=e^{-(Y_i-Y_k)^2/(2\sigma^2)}\times e^{-(X_i-X_k)^2/(2\sigma^2)}$$

Furthermore, if a transparency mask of the $i^{th}$ point is $a_i$, $Q_i$ indicates the neighborhood of the $i^{th}$ point, and trimap(k) indicates a trimap value of the $k^{th}$ point, the transparency mask value of the $i^{th}$ point is obtained by performing weighted averaging processing on similarities between the $i^{th}$ point and the foregoing n points whose trimap values are not the third value. When the similarity is calculated according to only the luminance component, $a_i$ may be obtained using the following formula (24).

$$a_i = \frac{\sum_{k\in Q_i} W(Y_i, Y_k)\times \text{Trimap}(k)}{\sum_{k\in Q_i} W(Y_i, Y_k)} \tag{24}$$

When the similarity is calculated according to the luminance-color joint component, $a_i$ may be obtained using the following formula (25).

$$a_i = \frac{\sum_{k\in Q_i} W(Y_i, Y_k)\times W(X_i, X_k)\times \text{Trimap}(k)}{\sum_{k\in Q_i} W(Y_i, Y_k)\times W(X_i, X_k)} \tag{25}$$

It should be understood that, in this embodiment of the present disclosure, an optional method for calculating a transparency mask of the target image is not limited to being applied to a specific scenario of this embodiment of the present disclosure, and may be applied to any scenario in which a transparency mask needs to be calculated.

Optionally, in an embodiment of the present disclosure, the determining module includes a third acquiring unit, where the third acquiring unit is configured to acquire a trimap value of each point in the target image, and a third determining unit, where the third determining unit is configured to determine a point that is in the target image and whose trimap value is a third value as the boundary point.

Optionally, in an embodiment of the present disclosure, the third acquiring unit is further configured to perform weighted averaging processing on color components of the $i^{th}$ point in the target image to obtain a weighted average value of the $i^{th}$ point, and when the weighted average value of the $i^{th}$ point is greater than a second threshold, set the trimap value of the $i^{th}$ point to the first value, or when the weighted average value of the $i^{th}$ point is less than a first threshold, set the trimap value of the $i^{th}$ point to the second value, or when the weighted average value of the $i^{th}$ point meets at least one of the following conditions the weighted average value of the $i^{th}$ point is greater than the first threshold and less than the second threshold, the weighted average value of the $i^{th}$ point is equal to the first threshold, and the weighted average value of the $i^{th}$ point is equal to the second threshold, set the trimap value of the $i^{th}$ point to the third value, where the second threshold is greater than the first threshold.

Optionally, in an embodiment of the present disclosure, the third acquiring unit further includes a credibility processing unit, where the credibility processing unit is configured to, when the trimap value of the $i^{th}$ point is the first value and a point whose trimap value is the second value exists in the neighborhood of the $i^{th}$ point, set the trimap value of the $i^{th}$ point to the third value; or when the trimap value of the $i^{th}$ point is the second value and a point whose trimap value is the first value exists in the neighborhood of the $i^{th}$ point, set the trimap value of the $i^{th}$ point to the third value, or when the trimap value of the $i^{th}$ point is the third value and a point whose trimap value is the first value or a point whose trimap value is the second value does not exist in the neighborhood of the $i^{th}$ point, set the trimap value of the $i^{th}$ point to the second value.

Optionally, in an embodiment of the present disclosure, a synthesis method that may be used for obtaining the color component of the $j^{th}$ boundary point by means of synthesis according to the color component of the non-boundary point in the $j^{th}$ area may be a weighted averaging method, a median filtering method, a non-local averaging method, or the like, and the present disclosure is not limited thereto.

Further, when the weighted averaging method is used to obtain the color component of the $j^{th}$ boundary point by means of synthesis, the following formula (26) may be used to calculate a U component and a V component of the $j^{th}$ boundary point that uses (x', y') as coordinates, where coordinates of a non-boundary point 1 located in an $i^{th}$ area $D_j$ are (x, y).

$$U(x', y') = \frac{\sum_{(x,y) \in D_j} W(x, y, x', y') U(x, y)}{\sum_{(x,y) \in D_j} W(x, y, x', y')} \qquad (26)$$

$$V(x', y') = \frac{\sum_{(x,y) \in D_j} W(x, y, x', y') V(x, y)}{\sum_{(x,y) \in D_j} W(x, y, x', y')}$$

$$W(x, y, x', y') = \begin{cases} e^{-((x-x')^2 + (y-y')^2)/2\sigma^2} & E(x, y) = 1 \\ 0 & E(x, y) = 0 \end{cases}$$

This embodiment of the present disclosure provides an image processing apparatus, which can be applied to an image matting and synthesis processing process, and can effectively avoid distortion of a synthesized image caused by imprecise estimation of an image transparency mask or a foreground image such that precision of image matting and synthesis processing can be improved.

FIG. 7 is a schematic block diagram of an image processing apparatus 700 according to another embodiment of the present disclosure. As shown in FIG. 7, the apparatus 700 includes a processor 710, a memory 720, and a bus 730. The processor 710 is connected to the memory 720 using the bus system 730, the memory 720 is configured to store an instruction, and the processor 710 is configured to execute the instruction stored in the memory 720.

The processor 710 is configured to determine m boundary points of a target image, acquire a color component of a non-boundary point in a $j^{th}$ area, where the $j^{th}$ area is a neighborhood of the $j^{th}$ boundary point in the m boundary points, $1 \leq j \leq m$, and m is a positive integer greater than or equal to 1, and perform synthesis processing according to the color component of the non-boundary point in the $j^{th}$ area, to obtain a color component of the $j^{th}$ boundary point.

This embodiment of the present disclosure provides an image processing apparatus, which can be applied to an image matting and synthesis processing process, and can effectively avoid distortion of a synthesized image caused by imprecise estimation of an image transparency mask or a foreground image such that precision of image matting and synthesis processing can be improved.

It should be understood that, in this embodiment of the present disclosure, the processor 710 may be a central processing unit (CPU), or the processor 710 may be another general purpose processor, a digital signal processor (DSP), an application-specific integrated circuit (ASIC), a field programmable gate array (FPGA), or another programmable logical device, discrete gate or transistor logical device, discrete hardware component, or the like. A general-purpose processor may be a microprocessor or the processor may be any conventional processor or the like.

The memory 720 may include a read-only memory and a random access memory, and provides an instruction and data to a processor 710. A part of a memory 720 may further include a non-volatile random access memory. For example, the memory 720 may further store information about a device type.

In addition to a data bus, the bus system 730 may further include a power bus, a control bus, a status signal bus, and the like. However, for clear description, various types of buses in the figure are marked as the bus system 730.

In an implementation process, the steps in the foregoing methods may be completed by means of an integrated logic circuit of hardware in the processor 710 or an instruction in a form of software. Steps of the methods disclosed with reference to the embodiments of the present disclosure may be directly executed and completed by means of a hardware processor, or may be executed and completed using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 720, and the processor 710 reads the information in the memory 720 and completes the steps in the foregoing methods in combination with hardware of the processor. To avoid repetition, details are not described herein again.

Optionally, in an embodiment of the present disclosure, the processor 710 is further configured to acquire a transparency mask value of each point in the target image, and determine a point whose transparency mask value meets a preset threshold condition as the foregoing boundary point.

Optionally, in an embodiment of the present disclosure, the processor 710 is further configured to acquire a trimap value of each point in the target image, and when a trimap value of the $i^{th}$ point is a first value or a second value, set a transparency mask value of the $i^{th}$ point to the trimap value of the $i^{th}$ point, or when a trimap value of the $i^{th}$ point in the target image is a third value, perform synthesis processing on trimap values of points that are in a neighborhood of the $i^{th}$ point and whose trimap values are not the third value, to obtain a transparency mask value of the $i^{th}$ point.

Optionally, in an embodiment of the present disclosure, the processor 710 is further configured to, acquire luminance components of the $i^{th}$ point and the points that are in an $i^{th}$ area and whose trimap values are not the third value, and calculate a similarity $W_{ik}$ between the $i^{th}$ point and the $k^{th}$ point, where the $k^{th}$ point is any point of the points that are in the neighborhood of the $i^{th}$ point and whose trimap values are not the third value.

Optionally, in an embodiment of the present disclosure, the processor 710 is further configured to obtain the similarity $W_{ik}$ according to the luminance component of the $i^{th}$ point and a luminance component of the $k^{th}$ point by means of calculation; or obtain the similarity $W_{ik}$ according to luminance-color joint components of the $i^{th}$ point and the $k^{th}$ point by means of calculation.

Optionally, in an embodiment of the present disclosure, the processor 710 is further configured to acquire a trimap value of each point in the target image, where a point whose trimap value is the first value is located in a foreground area, a point whose trimap value is the second value is located in a background area, and a point whose trimap value is the third value is located in an indeterminate area, determine a point that is in the target image and whose trimap value is the third value as a boundary point.

Optionally, in an embodiment of the present disclosure, the processor 710 is further configured to perform weighted averaging processing on color components of the $i^{th}$ point in the target image, to obtain a weighted average value of the $i^{th}$ point, where when the weighted average value of the $i^{th}$ point is greater than a second threshold, the trimap value of the $i^{th}$ point is the first value, or when the weighted average value of the $i^{th}$ point is less than a first threshold, the trimap value of the $i^{th}$ point is the second value, or when the weighted average value of the $i^{th}$ point meets at least one of the following conditions. The weighted average value of the $i^{th}$ point is greater than the first threshold and less than the second threshold, the weighted average value of the $i^{th}$ point is equal to the first threshold, and the weighted average value of the $i^{th}$ point is equal to the second threshold, the trimap value of the $i^{th}$ point is the third value; where the second threshold is greater than the first threshold.

Optionally, in an embodiment of the present disclosure, the processor 710 is further configured to, when the trimap value of the $i^{th}$ point is the first value and a point whose trimap value is the second value exists in the neighborhood of the $i^{th}$ point, set the trimap value of the $i^{th}$ point to the third value, or when the trimap value of the $i^{th}$ point is the second value and a point whose trimap value is the first value exists in the neighborhood of the $i^{th}$ point, set the trimap value of the $i^{th}$ point to the third value, or when the trimap value of the $i^{th}$ point is the third value and a point whose trimap value is the first value or a point whose trimap value is the second value does not exist in the neighborhood of the $i^{th}$ point, set the trimap value of the $i^{th}$ point to the second value.

Optionally, in an embodiment of the present disclosure, the processor 710 is further configured to convert the target image into a color space format with a luminance component.

Optionally, in an embodiment of the present disclosure, the processor 710 is further configured to, when the target image is in a YUV space format, acquire a U component and a V component of the non-boundary point in the $j^{th}$ area, or when the target image is in a Lab space format, acquire an a component and a b component of the non-boundary point in the $j^{th}$ area, or when the target image is in an HSV space format, acquire an H component of the non-boundary point in the $j^{th}$ area.

This embodiment of the present disclosure provides an image processing apparatus, which can effectively avoid distortion of a synthesized image caused by imprecise estimation of an image transparency mask or a foreground image, and can be applied to an image matting and synthesis processing process such that precision of image matting and synthesis processing can be improved.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. That whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure.

The foregoing descriptions are merely specific embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An image processing method, comprising:
creating a trimap value for each point of a plurality of points in a target image;
creating a transparency mask for each point in the target image according to its corresponding trimap value, wherein the transparency mask for an $i^{th}$ point in the target image is the corresponding trimap value for that point when the corresponding trimap value is a first value or a second value, and wherein the transparency mask for the $i^{th}$ point is a weighted average of luminance components of a plurality of points in the neighborhood of the $i^{th}$ point when the corresponding trimap value is a third value;

determining a boundary point of a plurality of m boundary points as a point that is in the target image and whose transparency mask value meets a preset threshold condition;

acquiring a color component of a non-boundary point in $j^{th}$ area, wherein the $j^{th}$ area is a neighborhood of the $j^{th}$ boundary point in the m boundary points, and wherein $1 \leq j \leq m$; and performing synthesis processing according to the color component of the non-boundary point in the $j^{th}$ area to obtain a color component of the $j^{th}$ boundary point.

2. The method according to claim 1, wherein a point whose trimap value is the first value is located in a foreground area of the target image, wherein a point whose trimap value is the second value is located in a background area of the target image, and wherein a point whose trimap value is the third value is located in an indeterminate area of the target image.

3. The method according to claim 2, wherein creating the transparency mask for the $i^{th}$ point when the corresponding trimap value is the third value comprises:

calculating a similarity $W_{ik}$ between the $i^{th}$ point and the $k^{th}$ point, wherein the $k^{th}$ point is any point of the points that are in the neighborhood of the $i^{th}$ point and whose trimap values are not the third value; and performing weighted averaging processing on similarities between the $i^{th}$ point and the points that are in the neighborhood of the $i^{th}$ point and whose trimap values are not the third value, to obtain the transparency mask value of the $i^{th}$ point.

4. The method according to claim 3, wherein calculating the similarity $W_{ik}$ between the $i^{th}$ point and the $k^{th}$ point comprises:

acquiring luminance components of the $i^{th}$ point and the points that are in the neighborhood of the $i^{th}$ point and whose trimap values are not the third value; and calculating the similarity $W_{ik}$ according to the luminance component of the $i_{th}$ point and a luminance component of the $k^{th}$ point.

5. The method according to claim 1, wherein before acquiring the color component of the non-boundary point in the $j^{th}$ area, the method further comprises converting the target image into a color space format with a luminance component.

6. The method according to claim 1, wherein acquiring the color component of the non-boundary point in the $j^{th}$ area comprises acquiring a U component and a V component of the non-boundary point in the $j^{th}$ area when the target image is in a luminance and chrominance component (YUV) space format.

7. An image processing apparatus, comprising:

a memory configured to store a target image, wherein the target image comprises a plurality of points; and a computer processor coupled to the memory and configured to:

create a trimap value for each point of the plurality of points in the target image;

create a transparency mask for each point in the target image according to its corresponding trimap value, wherein the transparency mask for an $i^{th}$ point in the target image is the corresponding trimap value for that point when the corresponding trimap value is a first value or a second value and wherein the transparency mask for the $i^{th}$ point is a weighted average of luminance components of a plurality of Points in the neighborhood of the $i^{th}$ point when the corresponding trimap value is a third value;

determine a boundary point of a plurality of m boundary points as a point that is in the target image and whose transparency mask value meets a preset threshold condition;

acquire a color component of a non-boundary point in a $j^{th}$ area, wherein the $j^{th}$ area is a neighborhood of the $j^{th}$ boundary point in the m boundary points, wherein $1 \leq j \leq m$; and perform synthesis processing according to the color component of the non-boundary point in the $j^{th}$ area to obtain a color component of the $j^{th}$ boundary point.

8. The apparatus according to claim 7, wherein a point whose trimap value is the first value is located in a foreground area of the target image, wherein a point whose trimap value is the second value is located in a background area of the target image, and wherein a point whose trimap value is the third value is located in an indeterminate area of the target image.

9. The apparatus according to claim 8, wherein when the trimap value of the $i^{th}$ point in the target image is the third value, the computer processor is further configured to:

calculate a similarity $W_{ik}$ between the $i^{th}$ point and a $k^{th}$ point, and wherein the $k^{th}$ point is any point of the points that are in the neighborhood of the $i^{th}$ point and whose trimap values are not the third value; and perform weighted averaging processing on similarities between the $i^{th}$ point and the points that are in the neighborhood of the $i^{th}$ point and whose trimap values are not the third value, to obtain the transparency mask value of the $i^{th}$ point.

10. The apparatus according to claim 9, wherein the computer processor is further configured to:

acquire luminance components of the $i^{th}$ point and the points that are in the neighborhood of the $i^{th}$ point and whose trimap values are not the third value and obtain the similarity $W_{ik}$ according to the luminance component of the $i^{th}$ point and a luminance component of the $k^{th}$ point by means of calculation.

11. The apparatus according to claim 7, wherein the computer processor is further configured to convert the target image into a color space format with a luminance component before acquiring the color component of the non-boundary point in the neighborhood of the $j^{th}$ boundary point in the m boundary points.

12. The apparatus according to claim 7, wherein computer processor is further configured to acquire a U component and a V component of the non-boundary point in the $j^{th}$ area when the target image is in a luminance blue red component (YUV) space format.

13. The method according to claim 3, wherein calculating the similarity $W_{ik}$ between the $i^{th}$ point and the $k^{th}$ point comprises:

acquiring luminance components and color components of the $i^{th}$ point and the points that are in the neighborhood of the $i^{th}$ point and whose trimap values are not the third value; and obtaining the similarity $W_{ik}$ according to luminance-color joint components of the $i^{th}$ point and the $k^{th}$ point by means of calculation.

14. The method according to claim 1, wherein acquiring the color component of the non-boundary point in the $j^{th}$ area comprises acquiring an a component and a b component of the non-boundary point in the $j^{th}$ area when the target image is in a lightness and color component a and color component b dimensions (Lab) space format.

15. The method according to claim 1, wherein acquiring the color component of the non-boundary point in the $j^{th}$ area comprises acquiring an H component of the non-boundary point in the $j^{th}$ area when the target image is in a hue saturation and value (HSV) space format.

16. The apparatus according to claim 9, wherein the computer processor is further configured to acquire luminance components and color components of the $i^{th}$ point and the points that are in the neighborhood of the $i^{th}$ point and whose trimap values are not the third value, and obtain the similarity $W_{ik}$ according to luminance-color joint components of the $i^{th}$ point and the $k^{th}$ point by means of calculation.

17. The apparatus according to claim 7, wherein computer processor is further configured acquire an a component and a b component of the non-boundary point in the $j^{th}$ area when the target image is in a lightness and color component a and component b dimensions (Lab) space format.

18. The apparatus according to claim 7, wherein computer processor is further configured to and acquire an H component of the non-boundary point in the $j^{th}$ area when the target image is in a hue saturation and value (HSV) space format.

19. The method of claim 4, wherein the similarity W is calculated using the formula:

$$W_{ik} = e^{\frac{-(Y_j - Y_k)^2}{(2\sigma^2)}}$$

wherein $Y_j$ is the luminance component of the $j^{th}$ point and wherein $Y_k$ is the luminance component of the $k^{th}$ point.

20. The apparatus of claim 9, wherein the similarity $W_{ik}$ is calculated using the formula:

$$W_{ik} = e^{\frac{-(Y_i - Y_k)^2}{(2\sigma^2)}}$$

wherein $Y_i$ is the luminance component of the $i^{th}$ point and wherein $Y_k$ is the luminance component of the $k^{th}$ point.

* * * * *